(12) United States Patent
Yakymyshyn et al.

(10) Patent No.: US 7,304,872 B1
(45) Date of Patent: Dec. 4, 2007

(54) POWER SUPPLY

(75) Inventors: Christopher Paul Yakymyshyn, Seminole, FL (US); Pamela Jane Hamilton, Seminole, FL (US); Michael Allen Brubaker, Loveland, CO (US)

(73) Assignee: Field Metrics, Inc., Seminole, FL (US)

( * ) Notice: Subject to any disclaimer, the term of this patent is extended or adjusted under 35 U.S.C. 154(b) by 321 days.

(21) Appl. No.: 11/162,807

(22) Filed: Sep. 23, 2005

Related U.S. Application Data (60) Provisional application No. 60/522,394, filed on Sep. 24, 2004.

(51) Int. Cl.
*H02M 7/06* (2006.01)

(52) U.S. Cl. .................. 363/126; 307/140; 361/56; 361/111

(58) Field of Classification Search .......... 363/34–39, 363/41, 125–126, 53, 61, 67; 307/140, 139; 361/465, 91.1
See application file for complete search history.

(56) References Cited

U.S. PATENT DOCUMENTS

| | | | |
|---|---|---|---|
| 3,001,120 A | 9/1961 | Bereskin ................. 363/126 |
| 3,286,171 A | 11/1966 | Fluegel et al. ........... 324/663 |
| 3,596,167 A | 7/1971 | Enge ...................... 363/61 |
| 4,084,217 A | 4/1978 | Brandli et al. ............ 363/4 |
| 4,412,278 A | 10/1983 | Cambier et al. ......... 363/126 |
| 4,417,198 A * | 11/1983 | Mayfield ................ 323/315 |
| 4,841,429 A | 6/1989 | McClanahan et al. ..... 363/126 |
| 5,009,764 A * | 4/1991 | Siefkes et al. ........ 204/298.08 |
| 5,714,861 A * | 2/1998 | Hansen et al. .......... 318/799 |
| 5,946,573 A * | 8/1999 | Hsu ...................... 438/275 |
| 6,014,325 A | 1/2000 | Pecore ................. 363/126 |
| 6,275,400 B1 | 8/2001 | O Breartuin ............ 363/126 |
| 2005/0162022 A1 | 7/2005 | Allard .................. 307/140 |

* cited by examiner

*Primary Examiner*—Rajnikant B. Patel (57) ABSTRACT

A modular, low weight impedance dropping power supply with battery backup is disclosed that can be connected to a high voltage AC source and provide electrical power at a lower voltage. The design can be scaled over a wide range of input voltages and over a wide range of output voltages and delivered power.

16 Claims, 5 Drawing Sheets

POWER SUPPLY

CROSS REFERENCE TO PRIOR APPLICATION

This application claims the priority of U.S. Provisional Application Ser. No. 60/522,394 filed Sep. 24, 2004 and entitled "POWER SUPPLY", the subject matter of which is incorporated herein by reference.

FEDERAL GOVERNMENT STATEMENT

This invention was made with Government support under contract DE-FG03-01ER83228 awarded by the Department of Energy. The Government has certain rights to this invention.

FIELD OF THE INVENTION

The present invention relates to an impedance or capacitor dropping power supply to provide power for equipment located on or near a high voltage power transmission line.

DESCRIPTION OF THE PRIOR ART

In alternating-current (AC) power systems, it is often desired to provide electrical power for equipment that is connected to a high voltage power line or bus conductor. Normally this is achieved using a step-down transformer to convert the high voltage between the power line and ground into a lower voltage that is suitable for powering electronic equipment. Alternatively, a capacitively coupled voltage transformer (CCVT) can be used for the same purpose. The CCVT consists of a high voltage capacitor connected in series with the primary of a step-down transformer. The transformer inductance and the high voltage capacitor form a resonant circuit with a resonance frequency near the power line frequency, and the secondary side of the step-down transformer provides an output voltage that is substantially proportional to the high voltage side of the capacitor, and substantially immune to variations in the impedance of a load connected to the secondary winding. Yet another alternative involves using a high voltage capacitor to couple power from a high voltage line to a load. The load impedance and the high voltage capacitor form a voltage divider, providing power to the load. In all cases, the weight and size of the device is determined by dielectric insulation and power requirements. The weight of a voltage transformer or a CCVT or a high voltage coupling capacitor is many hundreds of pounds when it is designed to operate from a high voltage power line with a voltage of 34,000 Volts AC or higher.

Another approach uses an iron core transformer that wraps around a high voltage conductor. The conductor provides the primary winding of the transformer, and the secondary winding provides a low voltage output that can provide power to electronic equipment. The transformer preferentially has a split core to allow for easy installation on a conductor, and the transformer is designed to provide sufficient power when the conductor current is substantially less than the rated current for the conductor. This approach has difficulties in providing a constant load power when significant variations in the line current occur.

A number of impedance coupling power supplies have been disclosed in the prior art, particularly as transformerless, low cost power supplies for use in household appliances. Generally, an impedance-coupling power supply consists of an impedance element that couples AC power from an AC voltage source to an AC to DC converter comprised of one or more rectifier diodes and a large filter capacitor. The circuit also may include a voltage limiting or regulating element to maintain a relatively constant output voltage. A load is connected across the output terminals of the power supply. Specific examples of this family of prior art are described below.

Allard discloses in pending U.S. Patent Application US2005/0162022, published on Jul. 28, 2005, an appliance with a capacitor dropping power supply that incorporates shunt switching. A capacitor and resistor in series are connected between an AC voltage source and more than one rectifying diodes. Each rectified voltage created by one or more rectifier diodes is filtered by a capacitor and clamped to a preset voltage by a zener diode. An electrical load is connected to each filtered output voltage. A silicon-controlled rectifier (SCR) is controlled in such manner that the source side of each rectifier diode is shorted to ground when the load current drops below a preset level. The switching process results in a reduction in the power dissipated in the zener diode when the load is disconnected or when the load draws minimal power.

Pecore, in U.S. Pat. No. 6,014,325 issued Jan. 11, 2000, discloses a controlled DC power supply for a refrigeration appliance. In this invention, a capacitor and resistor in series are connected between an AC voltage source and one or more rectifier diodes. The opposing ends of the rectifier diodes are connected to filter capacitors and one or more zener diodes that regulate the DC voltage on each filter capacitor. A transistor connected across the DC voltage terminals is controlled in such manner so as to short the filter capacitor to ground when the load connected to the DC output voltage is disconnected or switches to a low power mode. In this way, the power dissipated in the one or more zener diodes is substantially reduced when the load requires little or no power.

A dropping impedance power supply is disclosed by O. Breartuin in U.S. Pat. No. 6,275,400 issued Aug. 14, 2001. A motor is connected between an AC voltage source and a module consisting of at least one rectifier diode, a filter capacitor and a zener diode that clamps the DC voltage across the capacitor to a preset value. An electrical load is connected across the filter capacitor. A capacitor can be connected in parallel with the motor to provide a current path for the power supply when the motor is disconnected from the circuit.

A capacitive coupled power supply is disclosed by McClanahan et al. in U.S. Pat. No. 4,841,429 issued Jun. 20, 1989. Capacitors are used to couple a high frequency AC voltage source to a rectifier/filter module comprised of a bridge rectifier diode, filter inductors and a filter capacitor. The advantage of this approach is the ability to electrically isolate the DC output voltages of each module from each other, allowing the output voltages to be connected in series to achieve higher DC voltages.

Bereskin discloses in U.S. Pat. No. 3,001,120 issued Sep. 19, 1961, a power supply consisting of a resistor and capacitor in series, connected to an AC voltage source, to provide power to a bridge rectifier. The output of the bridge rectifier is filtered by two resistor/capacitor lowpass filters before feeding a low power DC load. The invention does not disclose a voltage clamping device.

Cambier et al. disclose an AC to DC converter using polarized isolation capacitors in U.S. Pat. No. 4,412,278 issued Oct. 25, 1983. Polarized capacitors are used to couple the output of an AC voltage source to a bridge rectifier and filter capacitor using a novel circuit configuration and additional rectifier diodes. The use of polarized capacitors allows the use of much higher valued capacitors to couple higher amounts of electrical power to the rectifier and filter circuit.

In the above-cited prior art describing impedance-coupled power supplies, impedance coupling with a reactive component such as a capacitor is preferred over a dissipative element such as a resistor to reduce power dissipation in the system. In addition, maximizing the power delivered to the load requires a match between the output impedance of the power supply with the impedance of the load. This requirement is not disclosed in the prior art. Instead, the capacitor used in the impedance-coupling element is selected to have sufficiently low impedance that the load power can be delivered by the power supply. For example, a capacitance value of 1 uF is commonly cited for an impedance-coupling power supply to provide 50 mA at 10 VDC to a 200 ohm load when the coupling capacitor is connected to a 120 VAC, 60 Hz voltage source. In this case, the load and the coupling capacitor form a voltage divider, resulting in a reduced voltage at the load. The power supply is functional, but the power transfer is not optimized, since the impedance of the power supply is approximately 2.65 kohms, more than ten times higher than the load impedance.

The ability to design an impedance-coupling power supply becomes increasingly difficult with larger differences in voltage between the AC voltage source and the DC voltage at the load. For example, it is difficult to achieve a coupling capacitance of more than 1 nF in a lightweight package when voltage sources of >10,000 VAC are considered. For a 10,000 VAC voltage source and a load impedance of 200 ohms, providing 10 VDC across the load requires a coupling capacitor of about 13 nF, which is difficult to achieve in a compact, low weight package. The use of polarized capacitors as disclosed by Cambier et al. is not possible at higher source voltages because of the difficulty in providing rectifier diodes with the required voltage withstand capability.

Fluegel et al. disclose a transformerless AC bridge in U.S. Pat. No. 3,286,171 issued on Nov. 15, 1966. The bridge is used to measure the dielectric properties of a capacitor. An AC voltage source is coupled through a capacitor to a double bridge consisting of four rectifier diodes and four resistors. The principle advantage disclosed is the ability to obviate the use of a coupling transformer between the AC voltage source and the bridge circuit.

Brandli et al. disclose an AC fed power supply for DC gas discharge lamps in U.S. Pat. No. 4,084,217 issued on Apr. 11, 1978. One bridge rectifier is fed through a common-mode transformer, and a second bridge rectifier is fed through a phase shifting circuit consisting of a common-mode transformer and two series-connected capacitors. The DC outputs of the two bridge rectifiers are connected in parallel to provide power to a DC gas discharge lamp. Here the capacitor coupling used for the second bridge rectifier is used as a phase shifting element to create pulsating currents that are substantially out of phase for the two bridge rectifier outputs, resulting in a relatively constant DC current at the discharge lamp.

Enge discloses in U.S. Pat. No. 3,596,167 issued Jul. 27, 1971 a means of creating a high voltage DC output using a low voltage, high frequency AC voltage source. Capacitive coupling between an AC voltage source and an isolation transformer feeds a rectifier circuit to generate isolated DC voltage. The secondary side of the first isolation transformer feeds the primary of a second transformer through a capacitive network, the secondary of which is also rectified to a DC voltage. Additional stages can be added to the circuit. Each capacitive network is designed to operate in resonance with the transformer to which is connects, at a frequency that coincides with the frequency of the AC source. The resulting DC voltages are isolated from each other, and can be connected in series to generate a high DC voltage. The AC voltage source operates preferably at high frequency to enable the use of low capacitor values in the circuit.

It is desired to create a power supply that converts high voltage AC voltage to low voltage AC or DC, that can be directly connected to a high voltage power line, is lightweight, compact and cost-effective, provides full power to the load regardless of the current flowing in the high voltage line, while at the same time meeting all dielectric test requirements. The power supply should not require a resonant circuit for operation. The power supply should have an adjustable output impedance to enable its application to a variety of load impedances with high efficiency. The power supply should also have a battery backup to provide uninterruptible power to a load.

BRIEF DESCRIPTION OF THE PRESENT INVENTION

The invention disclosed here is a power supply that connects directly to a high voltage AC power line, provides AC or regulated direct-current (DC) electrical power at low voltage, and can provide power referenced to either end of the power supply structure. The power supply is lightweight, it is scalable to higher voltages or higher delivered electrical power, and it can be retrofitted to existing electrical power line designs. The power supply can provide power when the line is energized at rated voltage but no appreciable current is flowing through the conductor.

In one embodiment of the invention, one or more capacitors are connected in series with one or more resistors to form an impedance string. One end of the impedance string is connected to a high voltage power line. The other end of the impedance string is connected to the primary winding of a first step-down transformer. The transformer is selected to have a high primary winding inductance, such that the resonant frequency of the transformer and coupling impedance is substantially lower than the operating frequency of the voltage source to which the power supply is connected. The other end of the primary winding of the first step-down transformer is connected to the primary winding of additional series-connected step-down transformers. Across each primary winding is placed a voltage-clamping device to protect the transformer winding from excessive voltages. The secondary sides of more than one step-down transformers are connected in parallel so that their output currents sum. The transformer secondaries connect to an optional isolation transformer and then to a rectifier circuit consisting of one, two or four rectifier diodes. The DC output of the rectifier is filtered by a capacitor, and adjusted to a preset DC voltage by a voltage regulator. An electrical load is connected to the output of the voltage regulator. The turns ratio of each step-down transformer is selected to increase the load impedance to a higher value, allowing a high valued impedance string to transfer more power to the load than would be possible without the use of the transformer.

In a second embodiment of the disclosed invention, a battery backup is added to the power supply to provide uninterrupted power to a load. A battery is connected to a voltage regulator with an output voltage that is set to be slightly lower than the regulation voltage of the regulator connected to the filter capacitor. The outputs of the two regulators are connected together. When the AC voltage source is active, the regulator connected to the filter capacitor provides power to the load, since it maintains the load voltage at a higher voltage than the setpoint voltage of the battery regulator. When the AC voltage source is disconnected, the battery regulator provides power to the load at a slightly lower setpoint voltage, and the filter capacitor regulator becomes reverse-biased and inactive.

The present invention reduces deficiencies inherent in prior art impedance coupling power supplies when attempts are made to use them with high voltage AC sources found in power transmission and distribution systems, where voltages can range from 4,000 VAC to 765,000 VAC.

One advantage of the present invention is that a high value coupling impedance can be used with a low impedance load and still achieve good power delivery to the load.

Another advantage of the present invention is that it is lightweight compared with other solutions.

Another advantage of the present invention is that the transformer and the coupling impedance have a resonant frequency that is far lower than the operating frequency, rather than selected to resonate at the operating frequency, as in a CCVT.

Another advantage of the present invention is that it is very compact in size.

Another advantage of the present invention is that it is capable of withstanding lightning impulse, switching surge and continuous AC over-voltages that are required of any equipment to be installed in a power utility system.

Another advantage of the present invention is that very high power supply efficiency can be achieved without using a switching regulator.

Another advantage of the present invention is that it can provide a battery backup capability to a load with no interruption in voltage.

Another advantage of the present invention is that it can be easily scaled to provide higher power.

DETAILED DESCRIPTION OF THE PREFERRED EMBODIMENTS

Figure 1:
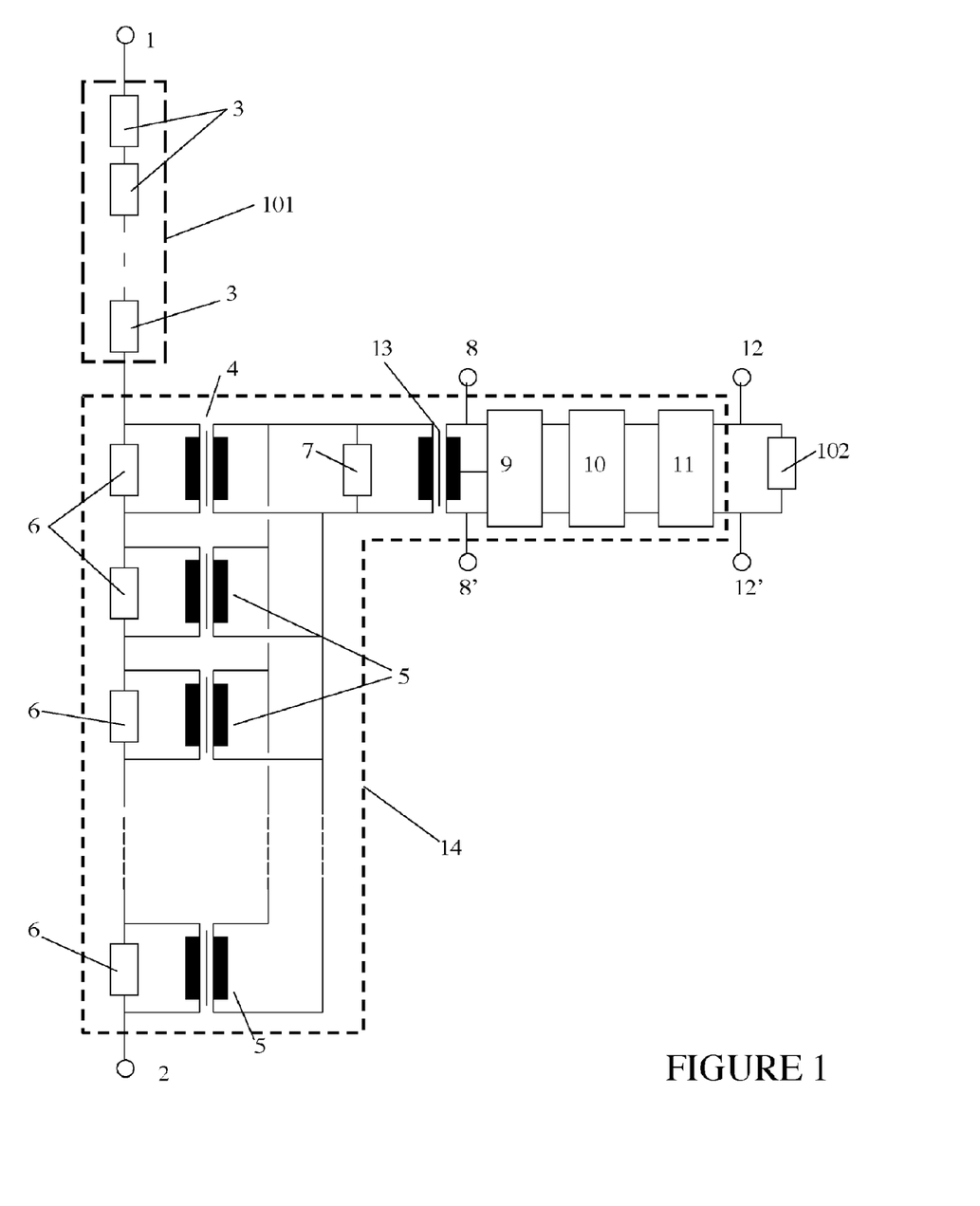
FIG. 1 is a schematic diagram of the impedance-coupling power supply.

FIG. 1 shows a schematic diagram of the power supply. The device is connected between two conductors 1 and 2 that establish an AC voltage difference across the device. The conductor 1 or 2 can be one phase of a three-phase power line, a common neutral connection, or a ground connection. One of the conductors is connected to a high voltage string 101 comprised of electrical impedance elements 3 that are connected in series. The impedance elements 3 are selected from the list including but not limited to a capacitor, a resistor, a capacitor in series with a resistor, a capacitor in parallel with a resistor, or a capacitor in parallel with a resistor that is in series with a resistor, although the preferred embodiment is a polymer film/foil capacitor in series with a wire-wound resistor. The opposite end of the high voltage string 3 is connected to one side of the primary of a transformer 4. At least one or more additional transformers 5 are connected in series with the primary of transformer 4 to increase the maximum permissible voltage across the series connection of transformers. Protection devices 6 are connected across the primary of each transformer 4 or 5 to prevent excess voltages from damaging the electrical insulation of the transformer primary windings. The secondary windings of the transformers 4 and 5 are connected in parallel and protected from electrical transients by protection device 7. Another transformer 13 can be included as a step-up or step-down transformer or as a means for creating a center-tapped secondary winding. The protection device 7 prevents damage to circuitry connected across nodes 8-8' by limiting the voltage on the secondary windings of the transformers 4, 5 or 13 (and therefore also limiting the voltage on the primary windings of the transformers 4 and 5) if all of the protection devices 6 fail to limit excessive voltages on the primary windings of the transformers 4 and 5. The protection device 7 is preferably selected to have an activation voltage that prevents it from being active when the protection devices 6 are correctly functioning. The secondary windings of transformers 4 and 5 are connected in parallel to increase the current available to the load connected to the power supply. The electrical output across nodes 8-8' is electrically isolated from the conductors 1 and 2, with an insulation level that is determined by the high to low insulation between the primary and secondary windings of each transformer 4 or 5, summed with the high to low insulation between the primary and secondary windings of transformer 13. The electrical output across nodes 8-8' is an AC voltage with a lower voltage than the voltage applied between the conductors 1 and 2. The AC voltage across nodes 8-8' is rectified into a DC electrical signal by rectifier 9, filtered to provide a DC electrical signal with a small voltage variation over time by filter circuit 10, and regulated to a constant DC voltage across nodes 12-12' by regulator circuit 11. An electrical load 102 is connected to the output of the regulator at nodes 12-12'. The output voltage across nodes 12-12' is electrically isolated from the conductors 1 and 2.

The AC voltage $V_b$ across nodes 8-8' is related to the voltage V between conductors 1 and 2 by the relation $V_b = V Z_{load}/[(Z_{load} + Z_{string})(NMp)]$, where N is the turns ratio of transformers 4 or 5, M is the turns ratio of transformer 13, $Z_{load}$ is the impedance of the electrical load connected across nodes 12-12' referred back to the primary side of transformers 4 and 5, p is the number of transformers 4 or 5 connected in series, and $Z_{string}$ is the total impedance of the impedance string 101. The losses in transformers 4, 5 and 13 are assumed to be negligible. The load impedance $Z_{load} = Z_b M^2 N^2 p^2$, where $Z_b$ is the load impedance connected across nodes 8-8'. The load impedance $Z_b$ is related to the actual load impedance $Z_o$ at 12-12', but the relationship depends on the operational details of the rectifier 9, filter 10 and regulator 11. The current $I_b$ available across nodes 8-8' is given by $I_b = V/(Z_{string} + Z_{load}) MNp$. The power delivered across nodes 8-8' is given by $P_b = V_b I_b = V^2 Z_b (MNp)^2/[Z_b(MNp)^2 + Z_{string}]^2$. Maximum power transfer from the conductors 1 and 2 to the load across nodes 8-8' occurs when $Z_{load} = Z_{string}$, or when the load impedance $Z_b$ is selected to be $Z_b = Z_{string}/(MNp)^2$.

For practical choices of transformers, the power transfer is limited by the maximum voltage that can be applied across the primary windings of transformers 4 and 5. The maximum voltage limit is determined by either the insulation between the transformer primary and secondary windings or by saturation of the magnetic core. The protection devices 6 are selected to limit the voltage across the primary winding of transformers 4 and 5 to a value which is less than the maximum capability of the transformer primary winding. This ensures reliable long term operation of the power supply. With a high load impedance $Z_b$, the voltage across nodes 8-8' is constant and determined by the protection devices 6. As the load impedance $Z_b$ is decreased, the load current increases, leading to increased power transfer. When $Z_b$ is sufficiently low, the voltage across the primary windings of transformers 4 and 5 is no longer capable of activating the protection devices 6, and the voltage across nodes 8-8' begins to decrease. The minimum allowable load impedance $Z_b$ is determined by the minimum permissible voltage across nodes 8-8' that maintains proper operation for circuits connected across nodes 8-8'.

The voltage, current and power available to a load connected across nodes 12-12' depends on the detailed operation of the rectifier 9, filter 10 and regulator 11. Since the load across nodes 12-12' can vary dramatically over time, the voltage $V_b$ and current $I_b$ across nodes 8-8' will also vary with time. The rectifier 9, filter 10 and regulator 11 determine the minimum voltage across nodes 8-8' that will still maintain correct operation of the regulator 11. A linear voltage regulator requires an input voltage that is slightly higher than the desired regulated output voltage across nodes 12-12'. A switching regulator can operate with an input voltage that is either lower or higher than the desired regulated output voltage, depending on whether the switching regulator has a boost topology (output voltage exceeds input voltage) or a buck topology (output voltage is lower than input voltage).

The regulator circuit 11 generates a constant output voltage for a range of input voltages above or below the output voltage level. If a switching regulator is used, then the power efficiency is typically about 70%-85% of the power delivered by the filter 10, and the input and output currents can be substantially different, depending on the input voltage and the load impedance. When a linear regulator is used for regulator 11, then the power efficiency varies greatly with the input voltage, since the input and output currents are almost equal. The best power efficiency of >90% can be achieved only when the input voltage is just sufficient to permit the proper operation of the linear regulator. Low dropout linear regulators typically need 0.1-0.3 V of voltage drop from input to output. For a 5V output voltage, an input voltage of 5.1-5.3V, and output current that greatly exceeds the quiescent current requirements of the regulator, the regulator has a power efficiency as high as 94%-98%. This efficiency is achieved only if the input voltage is precisely equal to the regulator's minimum required input voltage that maintains regulation of the output voltage. As the input voltage increases, the regulator efficiency quickly drops.

The switching regulator does not have a strong dependence of power efficiency on input voltage, since the input and output currents of a switching regulator can differ substantially. However, a switching regulator introduces undesirable noise into the output voltage, and it can have start-up issues when the regulator is driven by a source that behaves more like a current source than a voltage source. The linear regulator does not have startup issues and provides a very low noise output voltage. Since the efficiency varies with the input voltage, the power supply transformer ratios M and N must be selected to ensure that the input voltage at the regulator gives the maximum regulator efficiency at the maximum load current (or equivalently, the lowest load impedance Zo). This process ensures that the best linear regulator efficiency is achieved when the highest power is delivered to the load.

The transformers 4 and 5 are preferably selected to have very low copper losses in the windings, and very low core losses in the core material. To minimize copper losses, the wire gauge of the windings is selected to be of sufficient size that the series resistance of the winding is minimized, while maintaining as small a winding as possible to minimize field losses between the windings and the core. The core losses are minimized by selecting core materials with a high magnetic permeability and square law hysteresis, and by choosing a core mechanical structure that minimizes gaps in the core. The toroid is the preferred core geometry to provide high magnetic permeability and low loss. Since the impedance string 101 and the step-down transformers 4 and 5 do not have to be resonant at the operating frequency of the power supply, the transformers 4 and 5 can be very small. This is a distinct advantage over a CCVT, where a large transformer core and high turns count are required to achieve the high inductance needed to form a resonant circuit when the high voltage coupling capacitor has a small capacitance, such as a value of <10 nF.

Figure 2A:
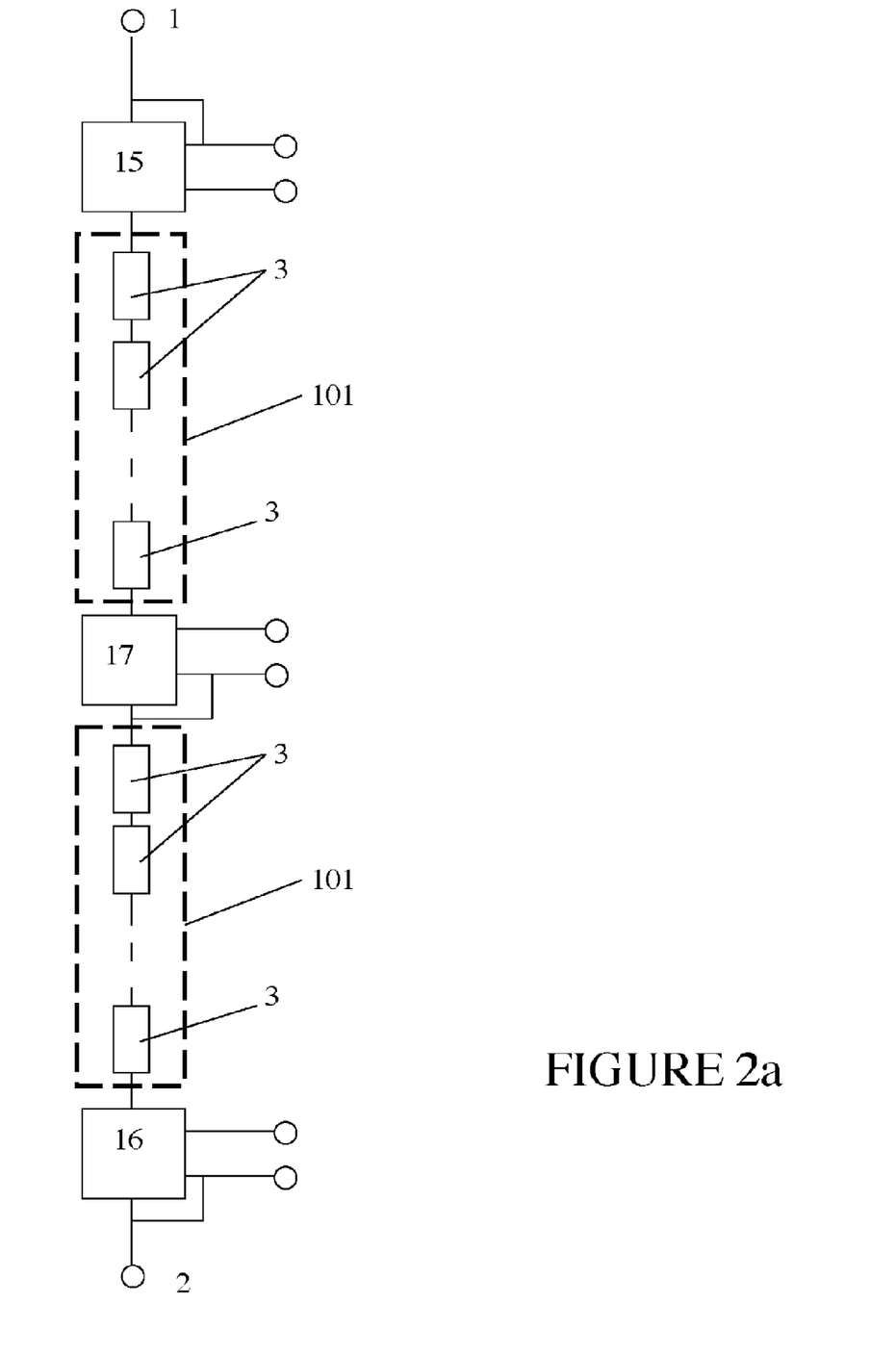
FIG. 2a is a schematic diagram of an impedance-coupling power supply with multiple outputs referenced to different voltages.

The combination of items 4 thru 13 constitutes a power module 14 indicated in FIG. 1. More than one power supply module can be connected to the impedance strings 101 to provide more than one power output. As shown in FIG. 2*a*, power supply modules 15 and 16 are placed at each end of the impedance strings 101. The output voltage from 15 is referenced to conductor 1, and the output voltage from 16 is referenced to conductor 2. Additional modules 17 can be placed between the impedance strings 101 as shown in FIG. 2, to provide multiple power outputs referenced to different voltages.

Figure 2B:
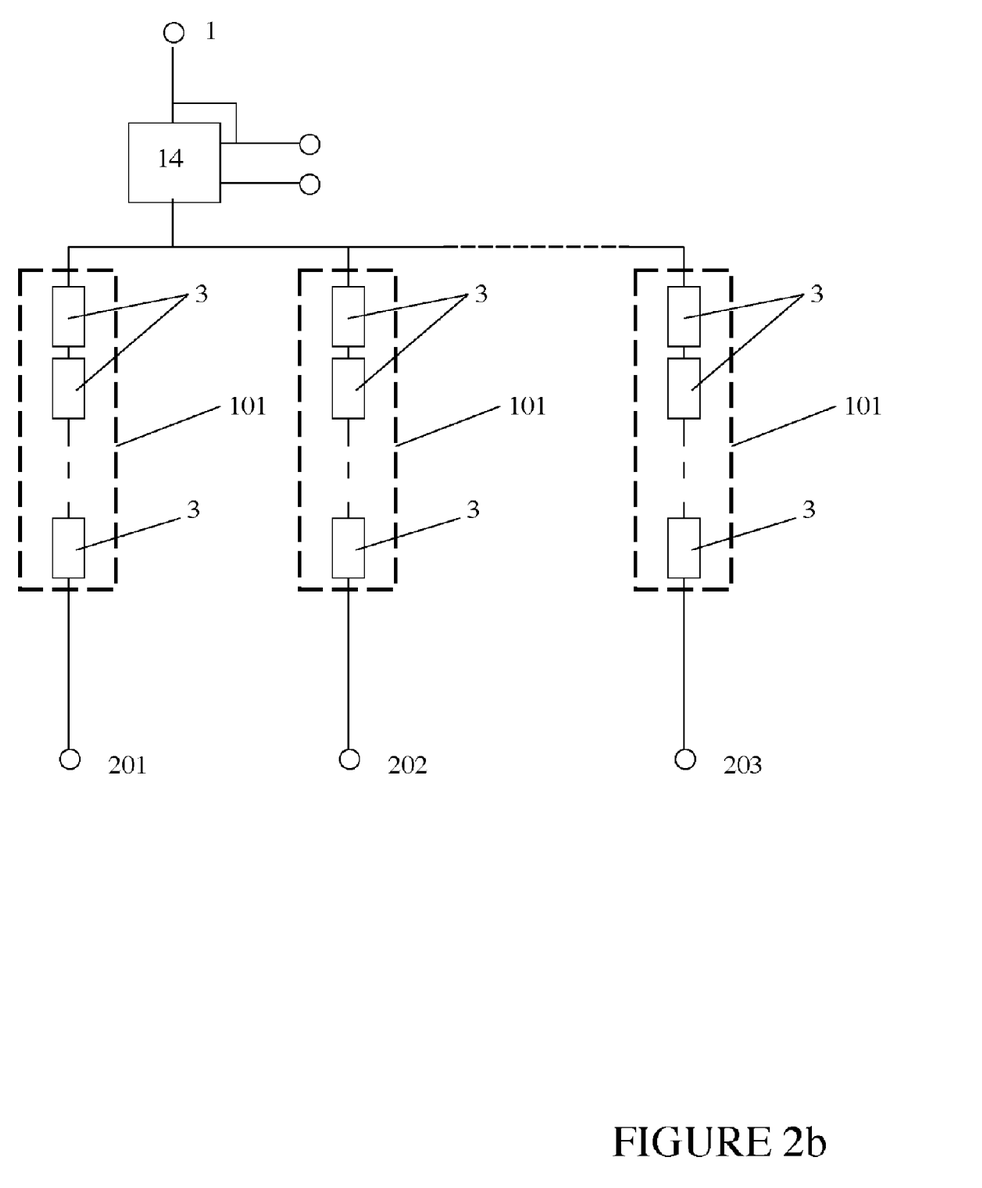
FIG. 2b is a schematic diagram of an impedance-coupling power supply supplied by several high voltage conductors.

In another embodiment of the invention, a power supply module 14 is connected to conductor 1 as shown in FIG. 2*b*. The other input of the power supply module 14 is connected to at least two impedance strings 101, each of which consists of a plurality of series connected impedance elements 3. The other end of each impedance string 101 is connected to a different conductor, shown for illustration purposes as 201, 202 and 203 in FIG. 2*b*. In this way, the impedance coupled power supply can be simultaneously supplied by a plurality of high voltage conductors.

Figure 3:
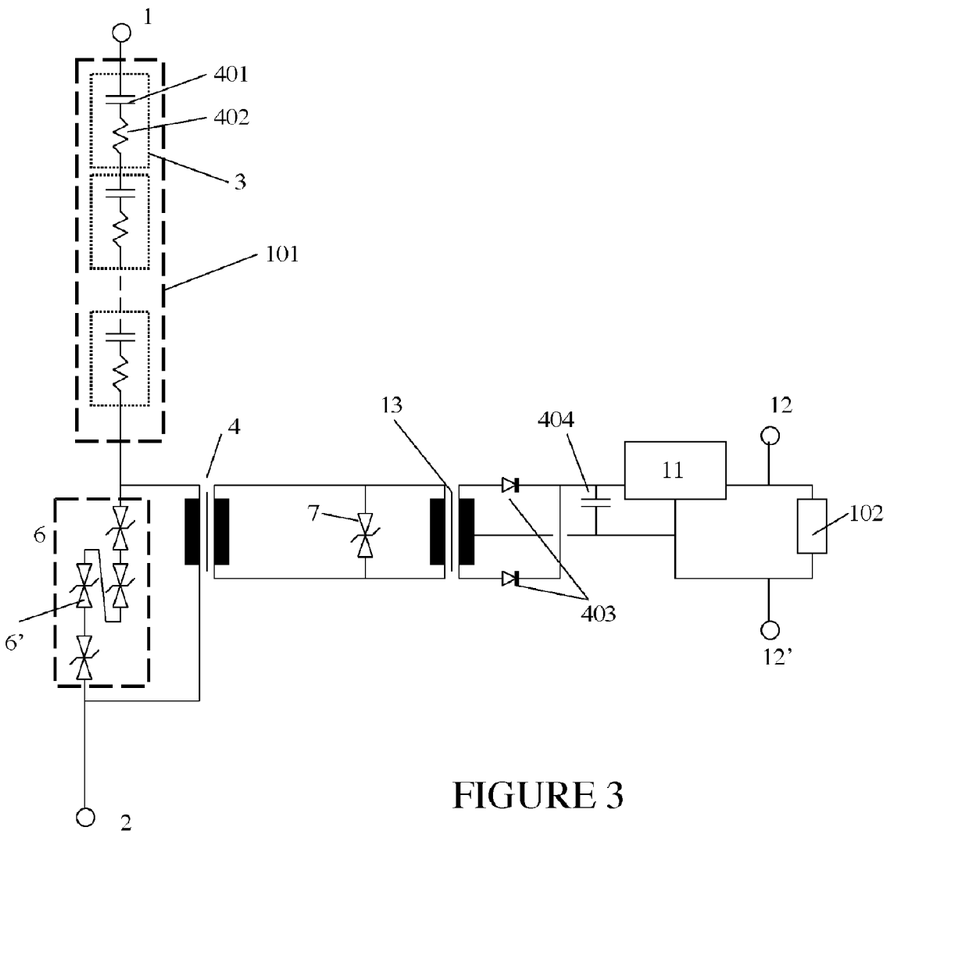
FIG. 3 is a schematic diagram of an impedance-coupling power supply specific embodiment.

A specific example of the power supply reduced to practice is described below and shown in FIG. 3. A high voltage string is comprised of 30 impedance elements connected in series. The impedance element 3 consists of a polymer film/foil capacitor 401 having a value of 15 nF connected in series with a wire-wound resistor 402 having a value of 3 Kohms. The transformer 4 has a primary winding voltage rating of 230 VAC, and a turns ratio of N=30. The voltage clamping element 6 is a transient voltage suppressor (TVS) with a clamping voltage of +/−400 Vpeak. To provide increased power dissipation capability in the TVS element 6, the clamping element 6 consists of four series-connected TVS devices 6', each rated at a clamping voltage of +/−100 Vpeak. The clamping device 7 is a TVS rated for a voltage of +/−100 Vpeak. The transformer 13 has a turns ratio of M=1 and a center-tapped secondary winding. A half-bridge rectifier is formed using Schottky diodes 403 to minimize the forward voltage drop and thereby minimize power losses in the rectifiers. The filter consists of an electrolytic capacitor 404. The regulator 11 is a linear, low dropout regulator. With 20,000 VAC at 60 Hz frequency applied between conductors 1 and 2, the power supply can deliver more than 2.5 Watts to a 50 ohm load 102. The power is limited by the clamping element 6 clamping the voltage on the primary of transformer 4 to avoid dielectric failure of the primary winding insulation.

In another example, the number of transformers 4 and 5 was varied from p=3 to p=8, with no transformer 13 and a resistive load placed across nodes 8-8'. The power delivered to the load and the load resistance that gave this power is listed below. The voltage across the primary of each transformer 4 or 5 was limited to 235 VAC rms.

| # transformers p | Max. R load Ohms | V load (Volts rms) | I load (Amps rms) | P load (Watts) |
|---|---|---|---|---|
| 3 | 28 | 9.65 | 0.32 | 3.09 |
| 4 | 21 | 10.04 | 0.45 | 4.52 |
| 5 | 16 | 9.81 | 0.58 | 5.70 |
| 6 | 13 | 9.67 | 0.71 | 6.87 |
| 7 | 11 | 9.67 | 0.81 | 7.8 |
| 8 | 10 | 10.05 | 0.91 | 9.14 |

The power supply can be easily scaled to deliver more power to the load by adding more transformers 4 or 5; by increasing the voltage withstand capability of each transformer 4 or 5 and therefore increasing the protective device 6 voltage rating; by decreasing the impedance of the impedance elements 3; by decreasing the number of impedance elements 3 in the high voltage string; or by increasing the frequency of the high voltage source.

Figure 4:
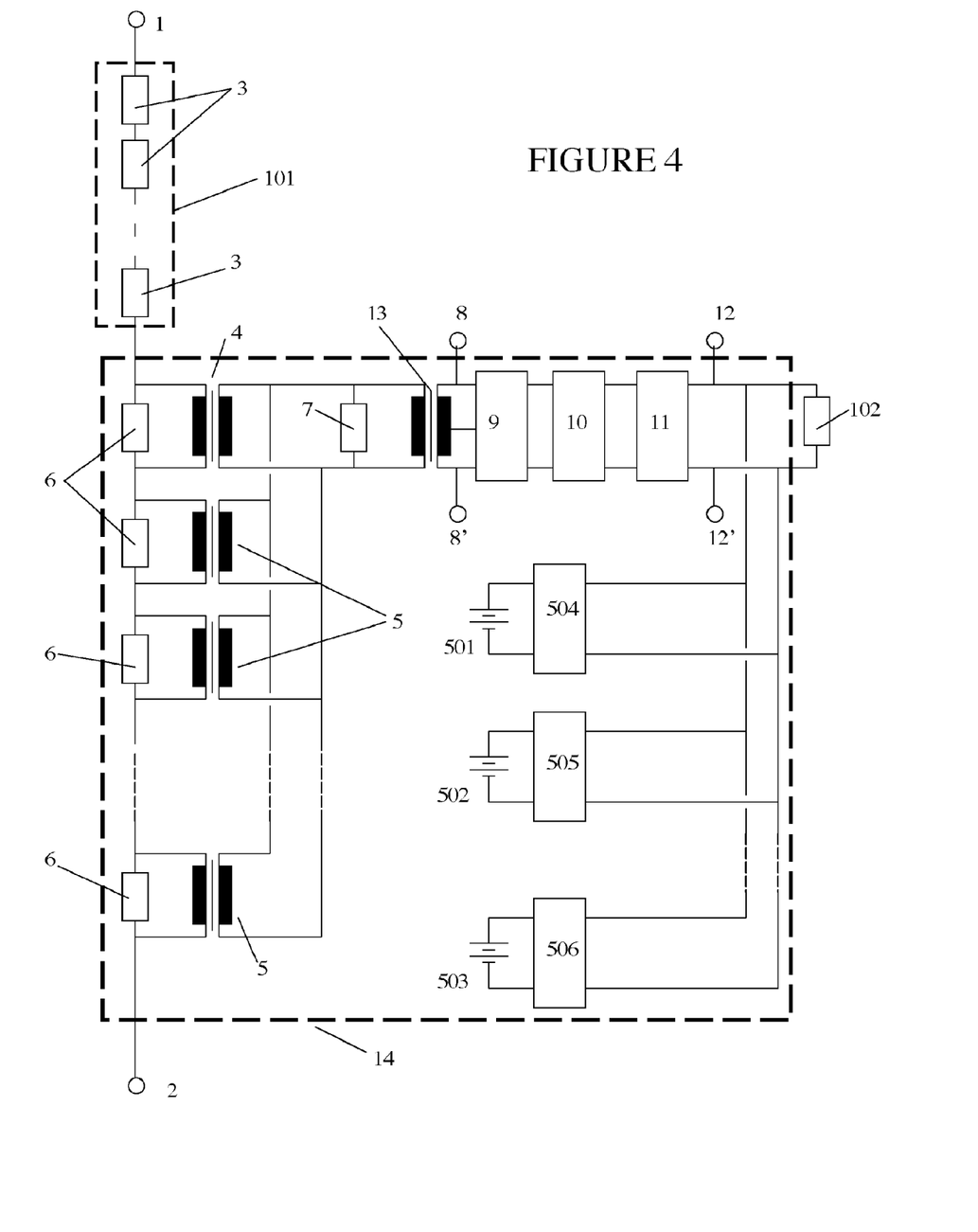
FIG. 4 is a schematic diagram of an impedance-coupling power supply with battery backup capability.

In some instances it is desirable to provide a battery backup for the power supply in case the voltage applied to the power supply input falls below a minimum acceptable value. A battery backup can be connected in parallel with the output of the regulator circuit in the following manner. See FIG. 4. The power supply module 14 is modified by adding one or more batteries and one or more regulators. As shown in FIG. 4, three batteries 501, 502 and 503 are fed into three regulators 504, 505 and 506, respectively. The outputs of the three regulators are connected together and also connected to the output of the regulator 11 fed from the filter circuit 10. Each battery 501, 502 and 503 is selected to provide an output voltage that exceeds the regulated output voltage of the power supply. The output of battery 501 is passed through a linear regulator 504 that is set to regulate the voltage to a value $V_{b1}$. The output of battery 502 is passed through a linear regulator 505 that is set to regulate the voltage to a value $V_{b2}$. The output of battery 503 is passed through a linear regulator 506 that is set to regulate the voltage to a value $V_{b3}$. Additional battery/regulator pairs can be added to the three illustrated in FIG. 4. The power supply main regulator 11 is set to regulate the output voltage to a value $V_{main}$. The value of $V_{main}$ is selected to be slightly higher than the value of $V_{b1}$, $V_{b2}$ and $V_{b3}$. The value of $V_{main}$ is preferably between 0.01 and 0.2 Volts higher than any of the battery regulator setpoints $V_{b1}$, $V_{b2}$ or $V_{b3}$. The battery regulators 504, 505 and 506 are also set to provide regulated output voltages that differ slightly from each other, with a preferable voltage difference between $V_{b1}$, $V_{b2}$ and $V_{b3}$ of between 0.01 and 0.1 Volts. The regulators 11, 504, 505 and 506 are selected to be capable of operating with very low current leakage when they are reverse biased.

When the main power regulator 11 is operating, the output is regulated at Vmain, and the battery regulators 504, 505 and 506 are not active, since the output voltage is higher than any of the regulator setpoint voltages $V_{b1}$, $V_{b2}$ and $V_{b3}$. The current to the load 102 is supplied completely by regulator 11. When the regulator 11 has a low input voltage applied to it, for example when power is removed from conductors 1 and 2, the battery regulator with the highest regulation setpoint voltage (the highest value of $V_{b1}$, $V_{b2}$ and $V_{b3}$) will provide all of the power to the load. The main regulator 11 is reverse biased, since its input is at a lower voltage, resulting in the main regulator 11 becoming inactive. The transition from battery backup to main power is smooth, with the regulators providing all of the required operating characteristics and requiring no additional components. The small difference between $V_{b1}$, $V_{b2}$ or $V_{b3}$ and $V_{main}$ of 0.01-0.2VDC causes minimal changes in the operation of electronic systems 102 powered by the power supply. As the first utilized battery becomes drained of charge, it can no longer support the voltage drop required for proper operation of its regulator. The output voltage will then drop until the second battery setpoint voltage is reached. At this point, the second battery begins to provide power to the load 102. As the second battery becomes discharged, the third battery will begin to provide power to the load 102 as the output voltage drops again. Eventually, all of the batteries will be discharged by the applied load.

While particular embodiments of the present invention have been illustrated and described, it is understood that the invention is not limited to the precise construction and compositions disclosed herein and that various modifications, changes, and variations will be apparent that lie within the scope and spirit of the invention as defined in the attached claims.

What is claimed is:

1. A dropping impedance power supply operative from a high voltage AC power line, with the first input of the power supply connected to a first conductor held at potential V1, and the second input of the power supply connected to a second conductor held at potential V2, comprised of:
   a high voltage impedance string consisting of one or more series-connected electrical impedances, each said impedance consisting of a resistor in series with a capacitor, said high voltage impedance string connected in series with one or more power modules each generating a reduced output voltage suitable for providing electrical power to electronic equipment connected to said modules;
   said power module each comprised of more than one step-down transformers, the primary windings of which are connected in series with each other, with the two ends of the series-connected transformers constituting the two input terminals of the power module;
   a voltage limiting element connected in parallel with the primary winding of each series-connected transformer;
   and the secondary windings of the step-down transformers connected in parallel with each other so as to sum their output currents, with the two common secondary winding connections constituting the two output terminals of the power module.

2. The power supply in claim 1 where one input terminal of one power module is connected to a first electrical conductor held at potential V1, and one end of the high voltage string is connected to a second electrical conductor held at potential V2.

3. The power supply in claim 1 where one output of the power module is electrically connected to one input of the power module to reference the output voltage of the power module to the input voltage of the power module.

4. The power supply in claim 1 where more than one power module and more than one high voltage string are connected in series.

5. The power supply in claim 1 where the first input terminal of a power module is connected to conductor 1 held at potential V1, the second input terminal of a power module is connected to one end of more than one high voltage strings, and the other end of each additional high voltage string is connected to one of conductors 2, 3, 4 . . . held at potentials V2, V3, V4, . . . , respectively.

6. The power supply in claim 1 where the voltage-limiting device is selected from the list including but not limited to a transient voltage suppressor, back-to-back zener diodes or a varistor.

7. The power supply in claim 1 where the transformers use a magnetic core with a toroidal shape.

8. The power supply in claim 1 where the transformers use a magnetic core with a square-law hysteresis loop to minimize core power loss and increase the winding inductance.

9. The power supply in claim 1 where the power module is comprised of a rectifier circuit to convert the AC voltage output of the transformers into a DC voltage, a filter circuit to reduce the variations of voltage with time, and a voltage regulator circuit to maintain the output voltage generated by the power module at a fixed value.

10. The power supply in claim 9 where the power module is also comprised of one or more batteries with a voltage regulator connected between each battery and the output of the power module.

11. The power supply in claim 10 where the regulation voltage of the voltage regulator connected to each battery is selected to be less than the regulation voltage of the voltage regulator connected to the output of the filter circuit.

12. The power supply in claim 11 where the regulation voltages of one or more regulators connected to one or more batteries form a series of decreasing voltages, all of which are lower than the regulation voltage of the voltage regulator connected to the output of the filter circuit, so that only one battery and regulator combination supplies power to the load at any given time.

13. The power supply in claim 9 where the voltage regulator is selected from the list that includes but is not limited to a linear regulator, a switching regulator, a zener diode regulator, a switching boost regulator, a switching buck regulator, or a switching boost-buck regulator.

14. The power supply in claim 9 where the rectifier circuit is selected from the list including but not limited to a single half-wave rectifier diode, two diodes coupled to a center-tapped transformer forming a full-wave half-bridge rectifier, or four diodes connected as a full-wave bridge rectifier.

15. The power supply in claim 9 where the filter circuit is selected from the list that includes but is not limited to one or more capacitors between the input terminals; one or more inductors between the input and output terminals and one or more capacitors across the output terminals; a pi filter consisting of one or more capacitors across the input terminals, one or more inductors between the input and output terminals and one or more capacitors across the output terminals; or a T filter consisting of one or more inductors connected between the input terminals and intermediate terminals, one or more capacitors connected across the intermediate terminals, and one or more inductors connected between the intermediate terminals and the output terminals.

16. The power supply in claim 9 where the impedance elements, transformer ratio, number of transformers and the linear regulator output voltage are selected to minimize the voltage drop across the linear regulator and still maintain proper regulator operation when the load impedance is at its minimum allowed value.

* * * * *